(12) United States Patent
Lee

(10) Patent No.: US 7,949,108 B2
(45) Date of Patent: May 24, 2011

(54) MODEM AND METHOD FOR SWITCHING OPERATION MODES THEREOF

(75) Inventor: Che-Ming Lee, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 1200 days.

(21) Appl. No.: 11/608,813

(22) Filed: Dec. 9, 2006

(65) Prior Publication Data

US 2008/0043945 A1 Feb. 21, 2008

(30) Foreign Application Priority Data

Jul. 7, 2006 (TW) .............................. 95124877 A

(51) Int. Cl.
*H04M 11/00* (2006.01)

(52) U.S. Cl. .................... 379/93.01; 379/93.34; 725/111

(58) Field of Classification Search ............... 379/93.01, 379/93.28, 93.31, 93.32, 93.34; 375/222; 725/111

See application file for complete search history.

(56) References Cited

U.S. PATENT DOCUMENTS 6,169,569 B1 * 1/2001 Widmer et al. ............... 725/111

2002/0144286 A1 10/2002 Ovadia
2005/0266818 A1 * 12/2005 Johnson et al. ............... 455/260

FOREIGN PATENT DOCUMENTS

| CN | 1667986 A | 9/2005 |
|---|---|---|
| CN | 1298127 C | 1/2007 |
| TW | 343412 | 10/1998 |

* cited by examiner

*Primary Examiner* — Stella L Woo
(74) *Attorney, Agent, or Firm* — Wei Te Chung

(57) ABSTRACT

A modem (10) includes a signal tuner module (101), a signal processing module (103), and a mode switching module (105). The signal tuner module receives a radio frequency (RF) signal in a first operation mode, and converts the RF signal to an intermediate frequency (IF) signal according to the first operation mode. The signal processing module processes the IF signal to generate an error rate according to the first operation mode. The mode switching module determines whether the first operation mode is right according to the error rate, and switches from the first operation mode to a second operation mode when the first operation mode is not right. A method for switching operation modes thereof is also provided.

15 Claims, 5 Drawing Sheets

MODEM AND METHOD FOR SWITCHING OPERATION MODES THEREOF

BACKGROUND OF THE INVENTION

1. Field of the Invention

The invention relates to a network apparatus, and particularly to a modem and a method for switching operation modes.

2. Description of Related Art

With developments in communication systems, cable modems have become widely used. Generally, cable modems include three types, namely a data over cable service interface specifications (DOCSIS) cable modem, a European DOCSIS (Euro-DOCSIS) cable modem, and a Japanese DOCSIS (J-DOCSIS) cable modem. Each type of cable modem has a respective specification, and works in a corresponding system such as a DOCSIS system, a Euro-DOCSIS system, or a J-DOCSIS system. Therefore, cable modem manufacturers must manufacture cable modems with different hardware and different firmware/software for customers with different specification requirements. In addition, multi system operators (MSO) must replace all hardware or update all firmware/software of cable modems for customers if the MSO switches from one system to another, for example, from a DOCSIS system to a Euro-DOCSIS system. Thus, the cost is relatively high.

SUMMARY OF THE INVENTION

An exemplary embodiment of the present invention provides a modem. The modem includes a signal tuner module, a signal processing module, and a mode switching module. The signal tuner module receives a radio frequency (RF) signal in a first operation mode, and converts the RF signal to an intermediate frequency (IF) signal according to the first operation mode. The signal processing module processes the IF signal to generate an error rate according to the first operation mode. The mode switching module determines whether the first operation mode is right according to the error rate, and switches from the first operation mode to a second operation mode when the first operation mode is not right.

Another exemplary embodiment of the present invention provides a method for switching operation modes in a modem. The method includes the following steps. A radio frequency (RF) signal is received from a channel in a first operation mode. The RF signal is converted to a first intermediate frequency (IF) signal according to the first operation mode. The first IF signal is processed to generate a first error rate according to the first operation mode. It is determined whether the first operation mode is right according to the first error rate. The first operation mode is switched to a second operation mode if the first operation mode is not right.

Other advantages and novel features will become more apparent from the following detailed description when taken in conjunction with the accompanying drawings, in which:

DETAILED DESCRIPTION OF THE INVENTION

Figure 1:
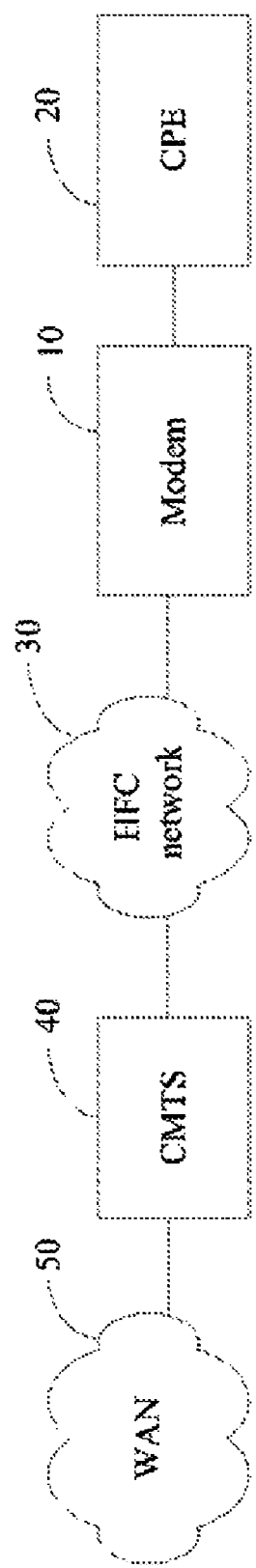
FIG. 1 is a schematic diagram of a data-over-cable system of an exemplary embodiment of the present invention.

FIG. 1 is a schematic diagram of a data-over-cable system of an exemplary embodiment of the present invention. In the exemplary embodiment, the data-over-cable system includes a modem 10, a customer premises equipment (CPE) 20, a hybrid fiber coaxial (HFC) network 30, a cable modem termination system (CMTS) 40, and a wide area network (WAN) 50. In this embodiment, the modem 10 may be a cable modem, and the CPE 20 may be a personal computer. The modem 10 may be in a data over cable service interface specifications (DOCSIS) operation mode, a European DOCSIS (Euro-DOCSIS) operation mode, or a Japanese DOCSIS (J-DOCSIS) operation mode.

The CPE 20 is connected to the modem 10. The modem 10 is connected to the CMTS 40 via the HFC network 30. The CMTS 40 is connected to the WAN 50. The transmission path over the data-over-cable system is realized at the head-end by the CMTS 40, and at each customer location by the modem 10. Thus, the CPE 20 accesses the WAN 50 via the modem 10, the HFC network 30, and the CMTS 40. The CMTS 40 converts data received from the WAN 50 to RF signals, and then transmits the RF signals to the modem 10 via channels of the HFC network 30. The modem 10 scans the channels of the HFC network 30 to receive the RF signals.

In the exemplary embodiment, the modem 10 initially receives a radio frequency (RF) signal in a first operation mode, and converts the RF signal to an intermediate frequency (IF) signal according to the first operation mode. The modem 10 then processes the IF signal to generate an error rate according to the first operation mode, determines whether the first operation mode is right according to the error rate, and switches from the first operation mode to a second operation mode when the first operation mode is not right. In such way, the modem 10 works in more than one operation mode, namely more than one system with different specifications, and selects an applicable operation mode when multi system operators (MSO) switch from one system to another, for example, from a DOCSIS system to a Euro-DOCSIS system. In addition, modem manufacturers may manufacture the same modem for customers with different specification requirements.

Figure 2:
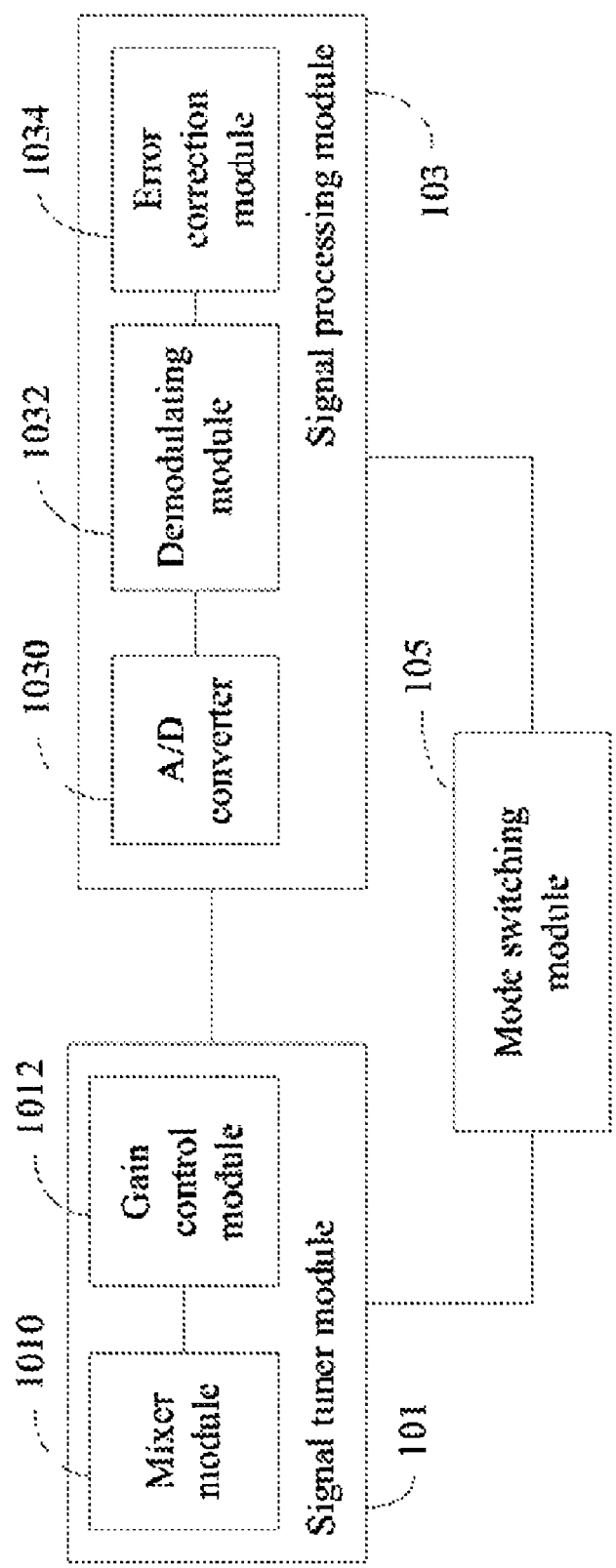
FIG. 2 is a schematic diagram of functional modules of a modem of another exemplary embodiment of the present invention.

FIG. 2 is a schematic diagram of functional modules of the modem 10 of an exemplary embodiment of the present invention. In the exemplary embodiment, the modem 10 includes a signal tuner module 101, a signal processing module 103, and a mode switching module 105. The modem 10 initially works in a first operation mode. The first operation mode may be a DOCSIS operation mode, a Euro-DOCSIS operation mode, or a J-DOCSIS operation mode.

The signal tuner module 101 receives a RF signal from a channel of the HFC network 30, and converts the RF signal to a first IF signal according to the first operation mode. In the exemplary embodiment, a frequency of the IF signal may be 4 MHz when the first operation mode is the DOCSIS mode, 5 MHz When the first operation mode is the Euro-DOCSIS mode, or 4 MHz When the first operation mode is the J-DOCSIS mode.

In other embodiments, the frequency of the IF signal in each operation mode may be different according to different tuner module architectures and demodulator implementations.

The signal tuner module 101 includes a mixer module 1010 and a gain control module 1012. The mixer module 1010 mixes the RF signal and a local oscillator (LO) signal to produce the first IF signal. The gain control module 1012 adjusts a gain of the first IF signal produced by the mixer module 1010.

The signal processing module 103 processes the first IF signal to generate a first error rate according to the first operation mode. In the exemplary embodiment, the first error rate is a forward error correction (FEC) error rate. The FEC may be compliant with Annex B of the international telecommunications union (ITU) J83 when the first operation mode is the DOCSIS mode, Annex A of the ITU J83 when the first operation mode is the Euro-DOCSIS mode, or Annex C of the ITU J83 when the first operation mode is the J-DOCSIS mode.

In other embodiments, the FEC in each operation mode may be compliant with different standards according to different requirements.

The signal processing module 103 includes an analog/digital (A/D) converter 1030, a demodulating module 1032, and an error correction module 1034. The A/D converter 1030 converts the IF signal to a digital signal. In the exemplary embodiment, the A/D converter 1030 converts the IF signal to the digital signal according to parameters such as a sampling rate corresponding to the frequency of the IF signal. The demodulating module 1032 demodulates the digital signal. The error correction module 1034 processes the demodulated digital signal to generate the first error rate according to the first operation mode.

The mode switching module 105 determines whether the first operation mode is right according to the first error rate, and switches from the first operation mode to a second operation mode when the first operation mode is not right. In the exemplary embodiment, the mode switching module 105 determines whether the first operation mode is right according to whether the first error rate is greater than a threshold error rate. If the first error rate is greater than the threshold error rate, the first operation mode is not right. In such case, the switching mode 105 switches from the first operation mode to a second operation mode. Otherwise, the first operation mode is right, and the modem 105 works in the first operation mode.

The signal tuner module 101 then converts the RF signal to a second IF signal according to the second operation mode. The signal processing module 103 processes the second IF signal to generate a second error rate according to the second operation mode. The mode switching module 105 determines whether the second operation mode is right according to the second error rate, and switches from the second operation mode to a third operation mode when the second operation mode is not right. In the exemplary embodiment, the first operation mode is selected from the group consisting of a DOCSIS operation mode, a Euro-DOCSIS operation mode, and a J-DOCSIS operation mode, the second operation mode is selected from the remaining two operation modes, and the third operation mode is the remaining one operation mode.

The signal tuner module 101 then converts the RF signal to a third IF signal according to the third operation mode. The signal processing module 103 processes the third IF signal to generate a third error rate according to the third operation mode. The mode switching module 105 determines whether the third operation mode is right according to the third error rate. If the third operation mode is right, the modem 10 works in the third operation mode. If the third operation mode is not right, the signal tuner mode 101 receives another RF signal from another channel of the HFC network 30, and the mode switching module 105 switches to the first operation mode.

Figure 3:
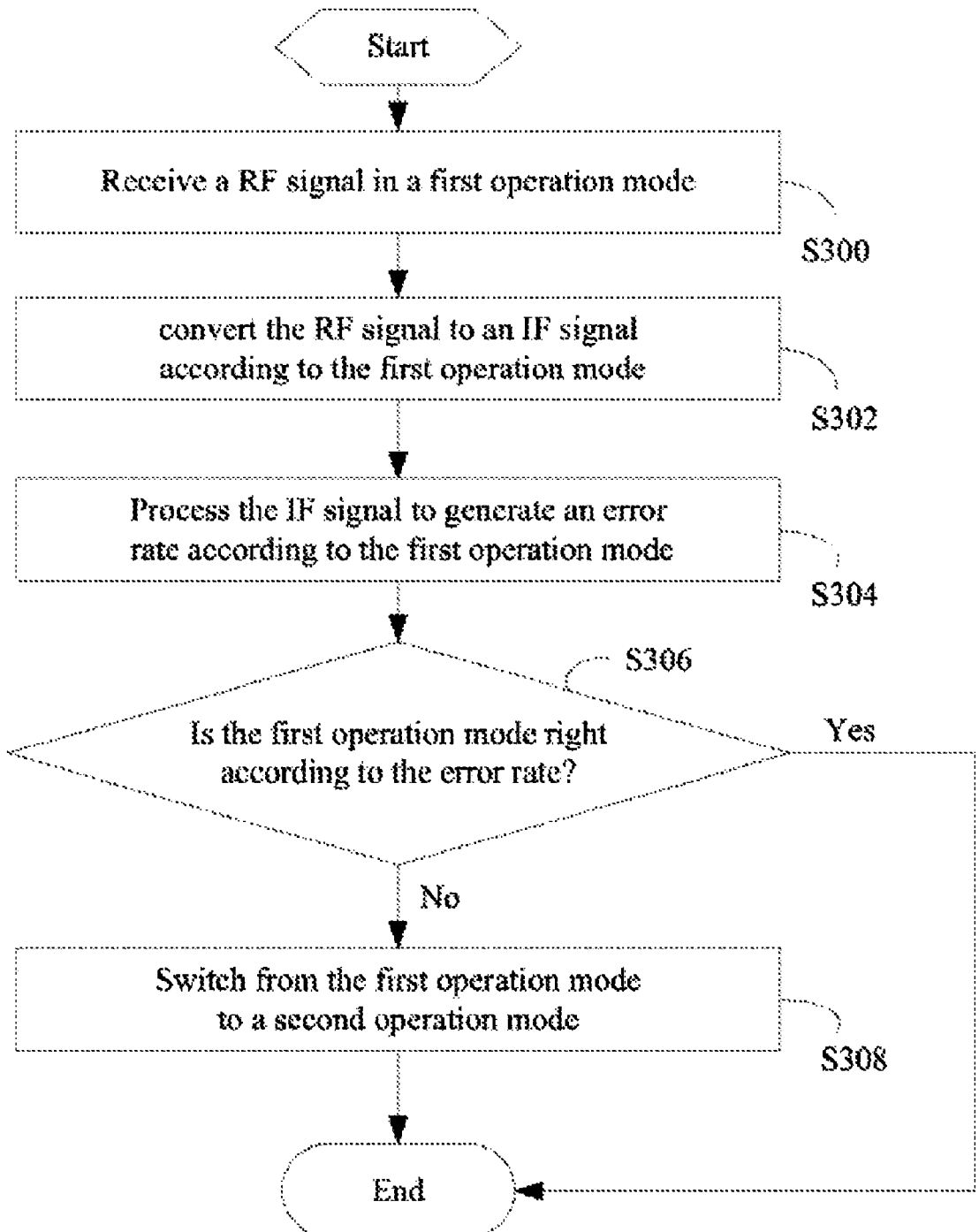
FIG. 3 is a flowchart of a method for switching operation modes of a further exemplary embodiment of the present invention.

FIG. 3 is a flowchart of a method for switching operation modes of an exemplary embodiment of the present invention.

In step S300, the signal tuner module 101 receives a RF signal in a first operation mode.

In step S302, the signal tuner module 101 converts the RF signal to an IF signal according to the first operation mode.

In step S304, the signal processing module 103 processes the IF signal to generate an error rate according to the first operation mode.

In step S306, the mode switching module 105 determines whether the first operation mode is right according to the error rate. If the first operation mode is right, the modem 10 works in the first operation mode.

If the first operation mode is not right, in step S308, the switching module 105 switches from the first operation mode to a second operation mode.

Figure 4:
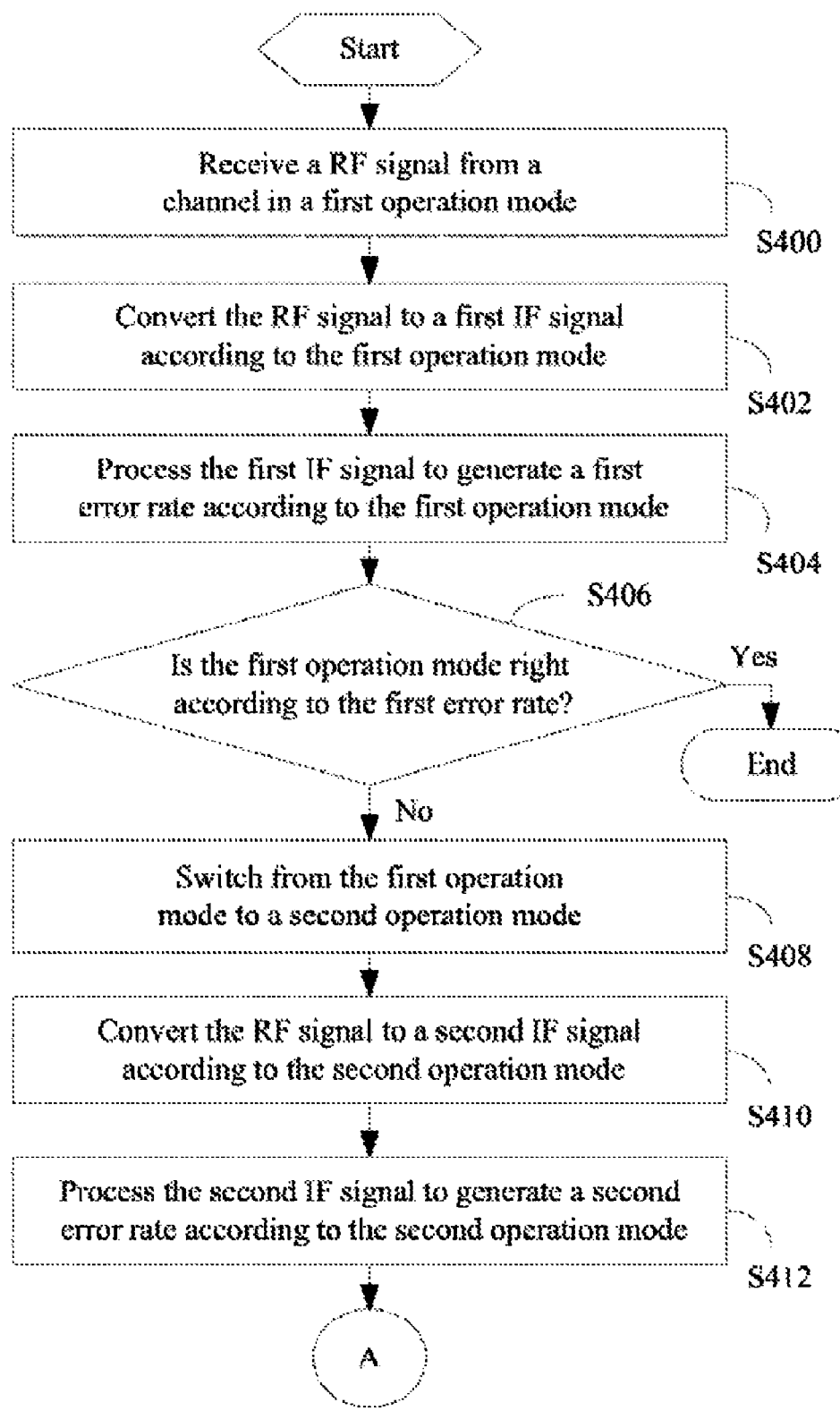
FIG. 4 is a flowchart of a method for switching operation modes of a yet further exemplary embodiment of the present invention, wherein the flowchart includes a node A.

FIG. 4 is a flowchart of a method for switching operation modes of another exemplary embodiment of the present invention. In the exemplary embodiment, the modem 10 selects an applicable operation mode.

In step S400, the signal tuner module 101 receives a RF signal from a channel in a first operation mode.

In step S402, the signal tuner module 101 converts the RF signal to a first IF signal according to the first operation mode. In the exemplary embodiment, the mixer module 1010 mixes the RF signal and a local oscillator signal to produce the first IF signal. The gain control module 1012 adjusts a gain of the first IF signal produced by the mixer module 1010.

In step S404, the signal processing module 103 processes the first IF signal to generate a first error rate according to the first operation mode. In the exemplary embodiment, the A/D converter 1030 converts the IF signal to a digital signal. The demodulating module 1032 demodulates the digital signal. The error correction module 1034 processes the demodulated digital signal to generate the first error rate according to the first operation mode. In this embodiment, the first error rate is an FEC error rate.

In step S406, the mode switching module 105 determines whether the first operation mode is right according to the first error rate. In the exemplary embodiment, the mode switching module 105 determines whether the first operation mode is right according to whether the first error rate is greater than a threshold error rate. If the first error rate is greater than the threshold error rate, the first operation mode is not right. Otherwise, the first operation mode is right, and the modem 105 works in the first operation mode.

If the first operation mode is not right, in step S408, the mode switching module 105 switches from the first operation mode to a second operation mode.

In step S410, the signal tuner module 101 converts the RF signal to a second IF signal according to the second operation mode.

In step S412, the signal processing module 103 processes the second IF signal to generate a second error rate according to the second operation mode. Then the process goes to a node A.

Figure 5:
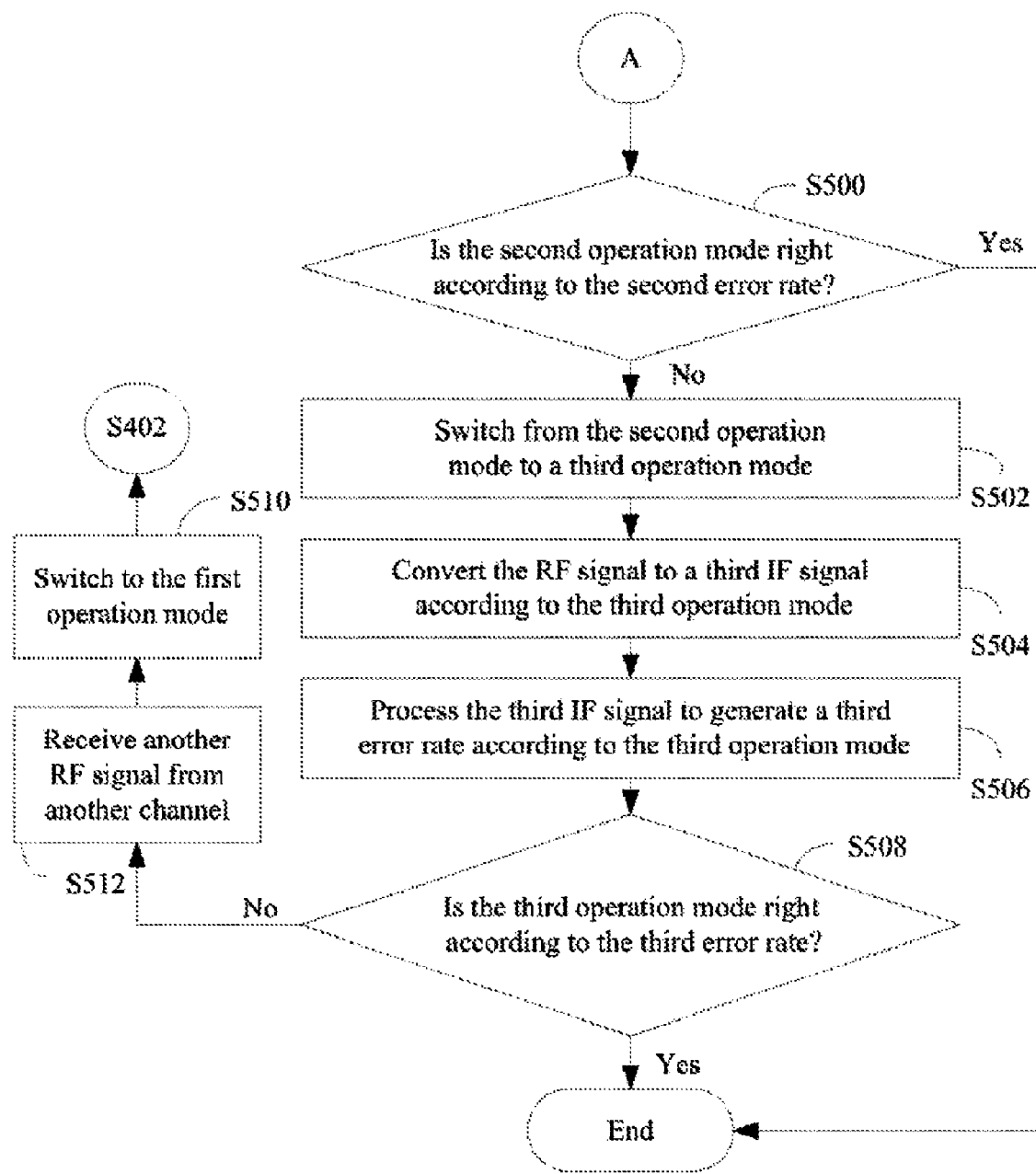
FIG. 5 is a flowchart of the method for switching operation modes after the node A of FIG. 4.

FIG. 5 is a flowchart of the method for switching operation modes after the node A of FIG. 4.

In step S500, the mode switching module 105 determines whether the second operation mode is right according to the second error rate. If the second operation mode is right, the modem 10 works in the second operation mode.

If the second operation mode is not right, in step S502, the mode switching module 105 switches from the second operation mode to a third operation mode. In the exemplary embodiment, the first operation mode is selected from the group consisting of a DOCSIS operation mode, a Euro-DOCSIS operation mode, and a J-DOCSIS operation mode, the second operation mode is selected from the remaining two operation modes, and the third operation mode is the remaining one operation mode.

In step S504, the signal tuner module 101 converts the RF signal to a third IF signal according to the third operation mode.

In step S506, the signal processing module 103 processes the third IF signal to generate a third error rate according to the third operation mode.

In step S508, the mode switching module 105 determines whether the third operation mode is right according to the third error rate. If the third operation mode is right, the modem 10 works in the third operation mode.

If the third operation mode is not right, in step S512, the signal tuner module 101 receives another RF signal from another channel.

In step S510, the mode switching module 105 switches to the first operation mode. The process then goes back to step S402, the signal tuner module 101 converts the RF signal to another first IF signal according to the first operation mode. Then the above steps are repeated until the modem 10 switches to an applicable operation mode.

In another embodiment, the sequences of step S512 and step S510 may be exchanged.

Thus, the modem 10 can select an applicable operation.

While various embodiments and methods of the present invention have been described above, it should be understood that they have been presented by way of example only and not by way of limitation. Thus the breadth and scope of the present invention should not be limited by the above-described exemplary embodiments, but should be defined only in accordance with the following claims and their equivalents.

What is claimed is:

1. A modem, comprising:
   a signal tuner module, for receiving a radio frequency (RF) signal in a first operation mode, and converting the RF signal to an intermediate frequency (IF) signal according to the first operation mode;
   a signal processing module, for processing the IF signal to generate a forward error correction (FEC) error rate according to the first operation mode; and
   a mode switching module, for determining whether the first operation mode is right according to the FEC error rate, and switching from the first operation mode to a second operation mode when the first operation mode is not right.

2. The modem as claimed in claim 1, wherein the signal tuner module comprises:
   a mixer module, for mixing the RF signal and a local oscillator signal to produce the IF signal; and
   a gain control module, for adjusting a gain of the IF signal.

3. The modem as claimed in claim 1, wherein the signal processing module comprises:
   an analog/digital (A/D) converter, for converting the IF signal to a digital signal;
   a demodulating module, for demodulating the digital signal; and
   an error correction module, for generating the FEC error rate according to the demodulated digital signal.

4. The modem as claimed in claim 1, wherein the modem is a cable modem.

5. A method for switching operation modes in a modem, comprising:
   receiving a radio frequency (RF) signal from a channel in a first operation mode;
   converting the RF signal to a first intermediate frequency (IF) signal according to first operation mode;
   processing the first IF signal to generate a first forward error correction (FEC) error rate according to the first operation mode;
   determining whether the first operation mode is right according to the first FEC error rate; and
   switching from the first operation mode to a second operation mode if the first operation mode is not right.

6. The method as claimed in claim 5, further comprising:
   converting the RF signal to a second IF signal according to the second operation mode;
   processing the second IF signal to generate a second FEC error rate according to the second operation mode;
   determining whether the second operation mode is right according to the second FEC error rate; and
   switching from the second operation mode to a third operation mode if the second operation mode is not right.

7. The method as claimed in claim 6, wherein the first operation mode is selected from the group consisting of a data over cable service interface specifications (DOCSIS) operation mode, a European DOCSIS (Euro-DOCSIS) operation mode, and a Japanese DOCSIS (J-DOCSIS) operation mode, the second operation mode is selected from the remaining two operation modes, and the third operation mode is the remaining one operation mode.

8. The method as claimed in claim 6, further comprising:
   converting the RF signal to a third IF signal according to the third operation mode;
   processing the third IF signal to generate a third FEC error rate according to the third operation mode;
   determining whether the third operation mode is right according to the third FEC error rate; and
   receiving another RF signal from another channel if the third operation mode is not right.

9. The method as claimed in claim 5, further comprising switching to the first operation mode.

10. The method as claimed in claim 5, wherein the step of converting the RF signal to a first IF signal according to the first operation mode comprises:
    mixing the RF signal and a local oscillator signal to produce the IF signal; and
    adjusting a gain of the IF signal.

11. The method as claimed in claim 5, wherein the step of processing the first IF signal to generate a first FEC error rate according to the first operation mode comprises:
    converting the first IF signal to a first digital signal;
    demodulating the first digital signal; and
    generating the first FEC error rate according to the demodulated digital signal.

12. The method as claimed in claim 5, wherein the step of determining whether the first operation mode is right according to the first FEC error rate comprises determining whether the first operation mode is right according to whether the first FEC error rate is greater than a threshold error rate.

13. The method as claimed in claim 5, wherein the modem is a cable modem.

14. A method for switching operation modes in a modem to comply with different systems communicable with said modem, comprising:

retrieving signals from a currently communicating system in a modem when said modem is in a first operation mode thereof complying to be communicable with a first system;

generating a first forward error connection (FEC) error rate according to said retrieved signals and said first operation mode of said modem; and switching said modem from said first operation mode thereof to a second operation mode thereof complying to be communicable with a second system different from said first system when said first operation mode of said modem is verified not to comply with said currently communicating system based on said generated first FEC error rate.

15. The method as claimed in claim 14, further comprising the step of generating a second FEC error rate according to said retrieved signals and said second operation mode of said modem after said modem is switched from said first operation mode thereof to said second operation mode thereof.

* * * * *